(12) United States Patent
Hares et al.

(10) Patent No.: US 6,184,166 B1
(45) Date of Patent: Feb. 6, 2001

(54) LEAD-FREE GLASSES

(75) Inventors: George B. Hares; Jeffrey T. Kohli; James E. Webb, all of Corning, NY (US)

(73) Assignee: Corning Incorporated, Corning, NY (US)

( * ) Notice: Under 35 U.S.C. 154(b), the term of this patent shall be extended for 0 days.

(21) Appl. No.: 09/356,082

(22) Filed: Jul. 16, 1999

Related U.S. Application Data

(60) Provisional application No. 60/096,558, filed on Aug. 14, 1998.

(51) Int. Cl.$^7$ .................................................. C03C 3/078
(52) U.S. Cl. .............................. 501/72; 501/26; 501/65; 501/67; 428/426; 428/427; 428/428
(58) Field of Search ................... 501/26, 65, 67, 501/72; 428/426, 427, 428

(56) References Cited

U.S. PATENT DOCUMENTS

| | | | |
|---|---|---|---|
| 2,913,345 | 11/1959 | Duncun | 106/52 |
| 3,148,073 | 9/1964 | Englert et al. | 106/52 |
| 3,754,816 | 8/1973 | Ritze | 350/311 |
| 4,106,946 | 8/1978 | Ritze | 106/52 |
| 4,297,141 | 10/1981 | Tokunaga et al. | 501/67 |
| 4,970,178 | * 11/1990 | Klimas et al. | 501/67 |
| 5,270,269 | 12/1993 | Hares et al. | 501/72 |

\* cited by examiner

Primary Examiner—Karl Group
(74) Attorney, Agent, or Firm—Milton M. Peterson

(57) ABSTRACT

This invention relates to lead-free silicate glasses that find use in producing fine crystal glassware and in laminated ware applications. The glasses consist essentially, in weight percent, of:

| | | | |
|---|---|---|---|
| $SiO_2$ | 52–66 | ZnO | 15–30 |
| $Al_2O_3$ | 0–4 | BaO | 0–7 |
| $Li_2O$ | 0–4 | MgO + CaO + SrO | 0–4 |
| $Na_2O$ | 3–16 | $ZrO_2$ | 0–4 |
| $K_2O$ | 0–12 | $B_2O_3$ | 0–4. |

12 Claims, 1 Drawing Sheet

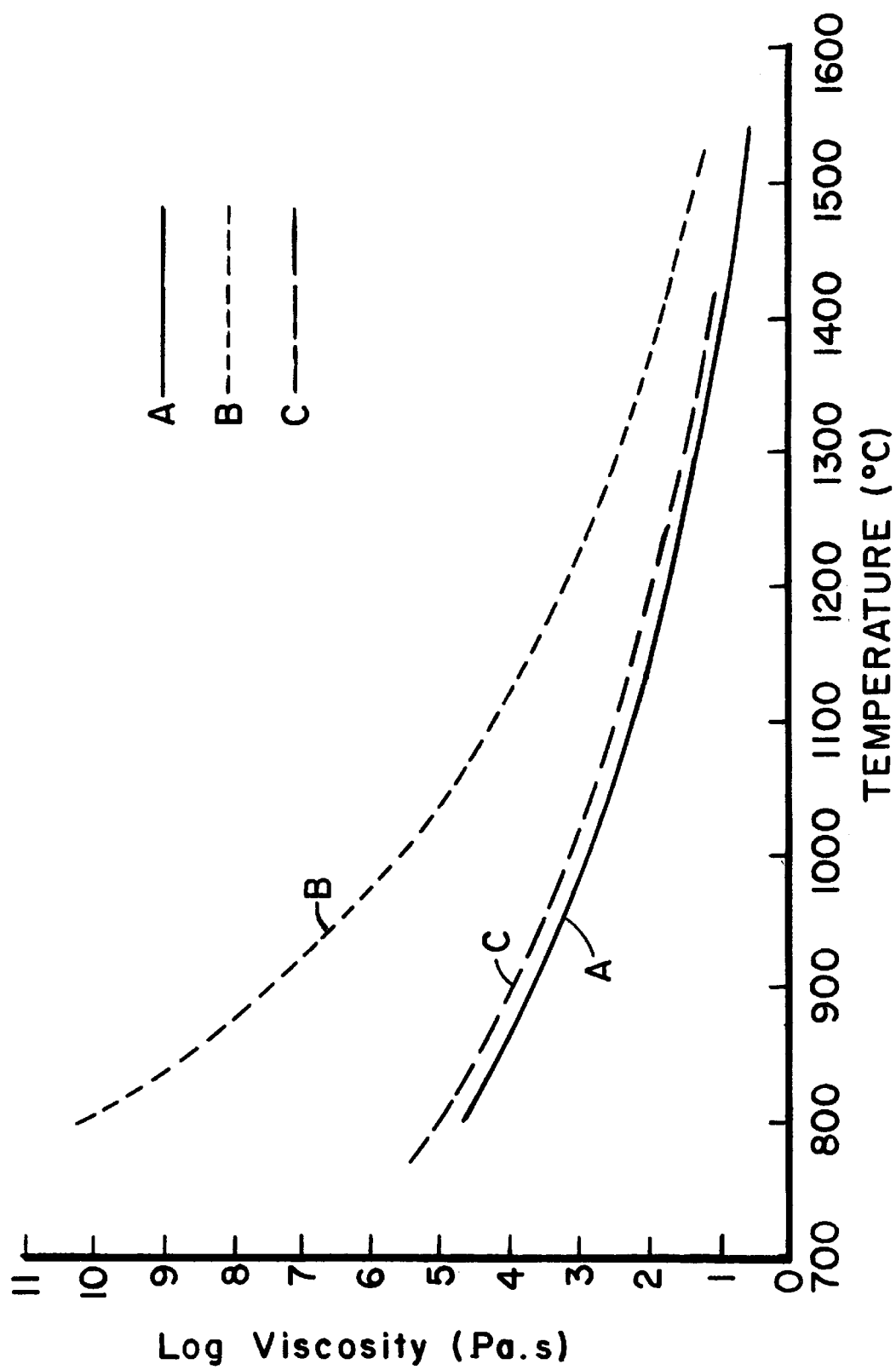

LEAD-FREE GLASSES

This application claims the benefit of U.S. Provisional Application, Ser. No. 60/096,558, filed Aug. 14, 1998 entitled LEAD-FREE GLASSES, by George B. Hares, Jeffrey T. Kohli and James E. Webb.

FIELD OF THE INVENTION

Lead-free glasses having properties that render them useful for production of crystal glassware and laminated ware.

BACKGROUND OF THE INVENTION

Silicate glasses, having a relatively high content of lead oxide in their compositions, have unique properties that particularly adapt them to use in production of crystal glassware. The properties of interest include a low liquidus temperature and a long viscosity range. These properties avoid the occurrence of devitrification during forming processes.

Environmental and health concerns have led to a desire to eliminate, insofar as possible, use of toxic oxides, in particular lead oxide, in glass compositions. U.S. Pat. No. 5,270,269 (Hares et al.) describes one approach to meeting this desirable end in the production of crystal glassware. The present invention provides a different approach.

The production of crystal glassware is usually a hand crafting operation. This involves several cycles of working and reheating a glass shape. It is, of course, desirable to complete as much of the shaping operation as possible during each cycle. This requires a low, liquidus temperature and a long, viscosity curve. The latter property translates into a long working range of temperatures without devitrification, that is, without any crystal formation in or on the glass.

Other properties of interest in crystal glassware include high refractive index, dispersion, and density values; also, good scratch resistance, and high chemical durability, that is, resistance to chemical attack and weathering. Another property of particular interest in thin-walled artware is the resonating sound that occurs when the rim of an article is lightly struck with another body such as a table utensil. This resonating sound is commonly known as the sonority, or ring, of a thin-walled article, such as a vase or goblet.

It is a purpose of the present invention to provide a family of glass compositions possessing properties useful both for crystal glassware and for laminated ware.

It is another purpose to provide a family of glass compositions free of toxic materials, in particular, free from lead compounds.

It is a further purpose to provide glasses having a CTE of 70–110×10$^{-7}$/° C., a density of at least 2.70 g/cm$^3$, a long viscosity curve, and a low liquidus value, such glasses being especially suited to production of crystal glassware.

It is a still further purpose to provide a family of glasses, as an alternative to the family disclosed in U.S. Pat. No. 5,270,269, for the production of crystal glassware.

SUMMARY OF THE INVENTION

The invention resides in part in a glass that is essentially lead-free, that exhibits a density of at least 2.70 g/cm$^3$, a liquidus below 1000° C., a long viscosity curve, a CTE of 70–110×10$^{-7}$/° C., good scratch resistance, and chemical durability, and that has a composition, expressed in terms of weight percent on an oxide basis, consisting essentially of:

| | | | |
|---|---|---|---|
| SiO$_2$ | 52–66 | ZnO | 15–30 |
| Al$_2$O$_3$ | 0–3 | BaO | 0–7 |
| Li$_2$O | 0–4 | MgO + CaO + SrO | 0–5 |
| Na$_2$O | 3–16 | ZrO$_2$ | 0–4 |
| K$_2$O | 0–12 | | |

The invention further resides in an article of crystal glassware molded from the above glass; also, in an article in which surfaces of two bodies are joined by laminating.

DESCRIPTION OF THE INVENTION

The glass family of the present invention was developed for use in production of crystal glassware. It represents an alternative to the glass family disclosed in the '269 patent for that purpose. While the present glass family is well-suited to that purpose, it has also been found to have properties adapted to certain glass laminating processes.

The glass composition of the earlier Hares et al. patent, is characterized by substantial contents of BaO and SrO with lesser amounts of ZnO. The present glass family requires neither BaO or SrO. At most, the presence of these oxides is permitted in limited amounts. Rather, the present glasses contain a relatively large amount of ZnO in contrast to the earlier glasses.

The present glasses are characterized by a low, liquidus temperature and a long, viscosity curve. The optimum viscosity for working an art glass is accepted as about 10$^4$ Pa.s (10$^5$ poises). This may also be stated as Log Viscosity in Pa.s equals 4. The present glasses will have this viscosity at temperatures in the range of 850° C. to 900° C. A long viscosity curve is measured in terms of the temperature range over which the glass viscosity varies by no more than a factor of 10 from the optimum value of 10$^4$ Pa.s, e.g., a temperature range of 750° to 975° C.

BRIEF DESCRIPTION OF FIGURE

The single FIGURE in the accompanying drawing is a graphical representation showing the viscosity/temperature curves for three different glasses. In the FIGURE, temperature (T), in degrees C., is plotted on the horizontal axis. Log viscosity, in Pa.s, is plotted on the vertical axis.

Curve A is the viscosity-temperature curve for the glass of Example 17 in TABLE I, infra. It illustrates a long, shallow curve typical of the present glasses. Curve B is the curve for a borosilicate glass having a typical, steep viscosity-temperature, curve. Curve C is the curve for a typical, soda lime silicate glass.

It will be observed that the curvatures of Curves A and C are very similar with Curve C being a bit elevated. This indicates a slightly harder glass, that is a glass that is a bit more viscous at any given temperature. Thus, the two glasses would match well for coating or laminating purposes.

In addition, for art glass purposes, the present glasses have a liquidus below about 1000° C., preferably below 900° C. They also exhibit good chemical durability, and scratch resistance, as measured by Knoop hardness, with values preferably above 430. They should also have a density of at least 2.7 g/cm$^3$, and a high refractive index.

A property of particular interest, the sonority, or ring, of the glass, is facilitated by having the alkali metal oxides Na$_2$O and K$_2$O present in equal molar amounts. Likewise, if Li$_2$O is present, all three alkali metal oxides are preferably present in equal molar amounts. In terms of weight percent, the preferred alkali metal oxide ratios approximate 3K$_2$O:2Na$_2$O:1Li$_2$O.

For laminating purposes, the important properties are CTEs of 70–110×10$^{-7}$/° C., a low liquidus temperature and freedom of the composition from toxic oxides, particularly lead oxide. The glasses should also have closely matching viscosity-temperature curves. Preferably, the Log viscosity values differ by not more than about 0.5 over the entire temperature range.

The glasses are basically silicates with SiO$_2$ being the primary glass former. Broadly, glasses having properties suitable for present purposes consist essentially of, in weight percent as calculated from the batch on the oxide basis: 52–66% SiO$_2$, 0–3% Al$_2$O$_3$, 0–4% ZrO$_2$, 0–4% B$_2$O$_3$, 0–4% Li$_2$O, 3–16% Na$_2$O, 0–12% K$_2$O, 15–30% ZnO, 0–7% BaO and 0–5% MgO+CaO+SrO. In addition, up to 5% of one or more oxides selected from Y$_2$O$_3$, La$_2$O$_3$, Nb$_2$O$_5$, and Ta$_2$O$_5$ may be present, primarily to improve density and/or refractive index.

A feature of the invention is the replacement of lead oxide by zinc oxide. This replacement, in conjunction with control of the alkali metal oxides, provides the desired viscosity and liquidus characteristics previously attained with lead oxide. The present glasses, containing zinc oxide, have much better scratch resistance than prior glasses containing lead oxide. They also provide improved chemical and weathering durability.

At least 3% Na$_2$O is required and up to 16% may be present. The alkali metal oxides contribute a relatively high CTE. While K$_2$O and LiO$_2$ are not required, it is highly desirable to have a mixture of the three alkaline metal oxides present to provide the sonority property; also good electrical resistance where that property is a factor.

Al$_2$O$_3$ stabilizes the glass and improves chemical durability. Accordingly, at least 0.5% and preferably 1% are present. However, it stiffens the glass and pushes the viscosity curve higher. ZrO$_2$ has a similar effect and must be limited.

B$_2$O$_3$ lowers the CTE and may be used for that purpose. However, it is preferably absent, and the total R$_2$O+B$_2$O$_3$ preferably does not exceed about 16%.

While not required, BaO serves to increase CTE and density. Accordingly, up to 7% BaO may be employed. The remaining alkaline earth metal oxides, MgO, CaO and SrO add nothing in particular to the present glasses, but may be present up to about 4–5%.

As indicated subsequently in TABLE I, compositions in which at least 97% consists of the following, somewhat narrower, component ranges, in weight %, are preferred for optimum properties:

| | | | |
|---|---|---|---|
| SiO$_2$ | 56–63% | ZnO | 15–25% |
| Al$_2$O$_3$ | 1–3% | BaO | 0–7% |
| Li$_2$O | 0–3% | MgO + CaO + SrO | 0–4% |
| Na$_2$O | 4–16% | B$_2$O$_3$ | 0–2% |
| K$_2$O | 0–11% | | |

SPECIFIC EMBODIMENTS

TABLE I records a group of glass compositions, expressed in terms of weight percent on the oxide basis, illustrating the compositional parameters of the present invention.

TABLE I

| Wt. % | 1 | 2 | 3 | 4 | 5 | 6 | 7 | 8 | 9 | 10 |
|---|---|---|---|---|---|---|---|---|---|---|
| SiO$_2$ | 61.7 | 61.7 | 59.4 | 59.4 | 57.2 | 57.2 | 52.7 | 59.2 | 58.2 | 62.2 |
| Al$_2$O$_3$ | 2.0 | 2.0 | 2.0 | 2.0 | 2.0 | 2.0 | 2.0 | 2.0 | 1.0 | 1.6 |
| Li$_2$O | 0.0 | 2.6 | 0.0 | 2.5 | 0.0 | 2.5 | 0.0 | 0.0 | 2.5 | 2.3 |
| Na$_2$O | 16.0 | 5.3 | 15.8 | 5.3 | 15.5 | 5.2 | 15.0 | 7.7 | 5.2 | 4.8 |
| K$_2$O | 0.0 | 8.1 | 0.0 | 8.0 | 0.0 | 7.8 | 0.0 | 11.6 | 7.8 | 7.3 |
| ZnO | 20.0 | 20.0 | 22.5 | 25.0 | 25.0 | 25.0 | 30.0 | 19.1 | 25.0 | 21.4 |
| Liquid Temp (° C.) | 890 | 840 | 855 | 885 | 880 | 995 | 1025 | 940 | 945 | 900 |
| Soft. Pt. (° C.) | 713 | 652 | 709 | 655 | 703 | 647 | 684 | 737 | 644 | 678 |
| Anneal Pt. (° C.) | 537 | 483 | 544 | 487 | 542 | 489 | 544 | 544 | 486 | 498 |
| Strain Pt. (° C.) | 494 | 443 | 503 | 447 | 501 | 450 | 506 | 499 | 447 | 457 |
| CTE (× 10$^{-7}$/° C.) | 91.6 | 87.4 | 90.6 | 86.9 | 90.3 | 87.2 | 90.4 | 103.6 | 88.5 | 81.1 |
| Density (g/cm$^3$) | 2.74 | 2.73 | 2.79 | 2.76 | 2.82 | 2.82 | 2.93 | 2.73 | 2.87 | 2.74 |

| Wt. % | 11 | 12 | 13 | 14 | 15 | 16 | 17 | 18 |
|---|---|---|---|---|---|---|---|---|
| SiO$_2$ | 67.2 | 63.6 | 63.9 | 62.2 | 61.6 | 61.0 | 62.0 | 61.8 |
| Al$_2$O$_3$ | 1.7 | 1.6 | 1.6 | 1.5 | 2.1 | 1.5 | 1.6 | 1.5 |
| Li$_2$O | 7.4 | 2.6 | 2.8 | 0.0 | 2.6 | 2.2 | 2.3 | 0.9 |
| Na$_2$O | — | 5.3 | 5.8 | 14.2 | 5.3 | 4.6 | 4.7 | 7.5 |
| K$_2$O | — | 8.1 | 8.8 | 0.0 | 8.1 | 7.0 | 7.2 | 7.1 |
| ZnO | 18.7 | 18.4 | 16.5 | 17.4 | 19.9 | 18.2 | 17.3 | 18.5 |
| BaO | 5.0 | 0.0 | 0.0 | 4.7 | 0.0 | 0.0 | 4.7 | 2.3 |
| La$_2$O$_3$ | — | — | — | 0.0 | 0.0 | 4.9 | 0.0 | 0.0 |
| Liquid Temp (° C.) | 1230 | 860 | 855 | 975 | 890 | 880 | 810 | 870 |
| Soft. Pt. ° C.) | — | 660 | 647 | 698 | 658 | 679 | 674 | 699 |
| Anneal Pt. (° C.) | 481 | 481 | 469 | 531 | 483 | 501 | 483 | 504 |
| Strain Pt. (° C.) | 449 | 442 | 430 | 491 | 445 | 459 | 441 | 461 |
| CTE (× 10$^{-7}$/° C.) | 66.4 | 88.9 | 93.5 | 90.8 | 89.2 | 81.7 | 88.7 | 92.6 |
| Density (g/cm$^3$) | 2.73 | 2.70 | 2.67 | 2.75 | 2.72 | 2.79 | 2.77 | 2.75 |

The TABLE also reports the softening point (S.P.), annealing point (A.P.), and strain point (St.P.) in ° C., the linear coefficient of thermal expansion (CTE) over the temperature range of 25–300° C. expressed in terms of $\times 10^{-7}/°$ C., and the density (Den) in grams/cm$^3$, as determined in accordance with measuring techniques conventional in the glass art.

Compositions 7 and 11 are comparative examples. Composition 7 illustrates the effect of a low $SiO_2$ content with maximum $Na_2O$ and ZnO contents. Composition 11 illustrates the effect of a high $SiO_2$ content in conjunction with no $Na_2O$ content. The glass of composition 11 phase separated during an attempt to measure the softening point.

The sound, or ring, of a glass, like any musical sound, is a matter of individual taste. Nevertheless, we have found that the degree, or efficiency, of glass resonance can be quantified. In such quantifications, the principles of resonant ultrasound spectroscopy (RUS), as described in a publication by Migliori and Sarrao, *Resonant Ultrasound Spectroscopy*, John Wiley and Sons, Inc., New York (1997), were employed.

The resonant quality (Q) of a material may be measured by various techniques. However, we have found that RUS equipment provides a simple means of obtaining experimental data having a high quality. The Q value is determined at a given frequency by a peak-fitting procedure.

Effectively, the resonant frequency is divided by the width of a peak at one half maximum power. The scan range is narrowed to focus on a single peak. The equipment scans display peaks at a constant phase angle. This angle is adjusted to obtain a symmetric peak prior to measurement of the peak width.

Numerous, resonant frequencies can be measured by scanning an appropriate, frequency range. It was found adequate to use an average of the first three modes for comparative purposes. Test pieces of glass, in the form of 10×8×6 mm, rectangular prisms, were prepared and tested. TABLE II sets forth the average Q values determined for several glasses having compositions in the $R_2O$-ZnO-BaO-$SiO_2$ family. The ratio of the $R_2O$ oxides, in the order of $LiO_2:Na_2O:K_2O$ in mol %, is shown for each composition. The compositions are identified by the numerical designation employed in TABLE I.

Measurements made on two different glasses, designated NIST 711 and HPFS, are shown for reference purposes. NIST 711 is a lead glass used as a viscosity standard by the National Institute of Standards and Technology. HPFS is a high purity, fused silica glass.

TABLE II

| Glass | Q Value | $R_2O$ Ratio |
|---|---|---|
| 19 | 4000 | 1:1:1 |
| 14 | 3935 | 1:1:1 |
| 20 | 3887 | 1:4:2.5 |
| 11 | 3446 | 1:0:1 |
| 8 | 3112 | 0:1:1 |
| 13 | 1854 | 0:0:1 |
| 12 | 1833 | 1:0:0 |
| 16 | 1016 | 0:1:0 |
| NIST | 3600 | — |
| HPFS | 6600 | — |

It is apparent that efficiency is favored by a mixture of the three $R_2O$ oxides. A mixture of two is not as efficient, but adequate. A single alkali metal oxide is generally not adequate regardless of the alkali metal. As a rule of thumb, a glass should have a Q value of at least 3,000 to be considered efficient. Preferably, the value is above 3,500.

The chemical durability of the glasses against acids is defined in terms of weight loss (W.L.A.). Values were determined by immersing polished plates of known weight for 24 hours in an aqueous bath of 5% by weight HCl operating at 95° C. After withdrawal from the bath and drying, the plates were re-weighed and the weight loss measured in terms of mg/cm2.

The chemical durability of the glass against bases is defined in terms of weight loss (W.L.B.). Values were determined by immersing plates of known weight for six hours in an aqueous bath of 0.02 N $Na_2CO_3$ operating at 95° C. After withdrawal from the bath and drying, the plates were re-weighed and the weight loss measured in terms of mg/cm2.

Three of the glasses shown in TABLE I, and the first glass shown in the Hares et al. '269 patent, were melted. Test pieces were prepared for determining acid and basic durability by the methods just described. The results are shown in TABLE III.

TABLE III

| Durability | 19 | 20 | 8 | −269 |
|---|---|---|---|---|
| Acid | 0.032 | 0.083 | 0.60 | 0.13 |
| Basic | 0.038 | 0.060 | 0.062 | 0.087 |

The actual, batch ingredients for preparing the glasses can comprise any materials, either oxides or other compounds, which, when melted together, will be transformed into the desired oxide in the proper proportions. For example, $K_2CO_3$, and $Na_2CO_3$ can provide the sources of $K_2O$ and $Na_2O$, respectively. $Sb_2O_3$ (not shown) may be included to perform its conventional function in glass melting as a fining agent.

The batch components were mixed together very thoroughly to assist in securing a homogeneous melt, and that mixture was charged into platinum crucibles. The crucibles were moved into a furnace operating at about 1450 C. and the batches melted for about three hours. Thereafter, the melts were poured into steel molds to form rectangularly-shaped slabs of glass having dimensions of about ~25.4× 10.16×1.27 cm(10"×4×0.5"). Those slabs were transferred immediately to an annealer operating at about 500° C.

Whereas the above description reflects laboratory melting and forming practice only, it must be appreciated that the compositions recited in TABLE I, complying with the terms of the subject invention, can be melted and formed in much larger quantities utilizing conventional, commercial melting units and glass forming techniques.

We claim:

1. A glass that is essentially free from lead, that exhibits a density of at least 2.70 g/cm$^3$, a liquidus below 1000° C., and a long viscosity curve, a coefficient of thermal expansion in the range 70–110×10$^{-7}/°$ C., good scratch resistance and chemical durability, and that has a composition, expressed in terms of weight percent on an oxide basis of:

| | | | |
|---|---|---|---|
| $SiO_2$ | 52–66 | ZnO | 15–30 |
| $Al_2O_3$ | 0–4 | BaO | 0–7 |
| $Li_2O$ | 0–4 | MgO + CaO + SrO | 0–4 |
| $Na_2O$ | 3–16 | $ZrO_2$ | 0–4 |
| $K_2O$ | 0–12 | $B_2O_3$ | 0–4. |

2. A glass in accordance with claim 1 which contains at least 0.5% $Al_2O_3$.

3. A glass in accordance with claim 1 in which the total of $Na_2O+K_2O+Li_2O+B_2O_3$ does not exceed about 16%.

4. A glass in accordance with claim 1 which contains the three alkali metal oxides, $K_2O$, $Na_2O$ and $Li_2O$ in the molar ratio of 1:1:1.

5. A glass in accordance with claim 1 having a composition, expressed in weight percent on an oxide basis, in which at least 97% consists essentially of 56–63% $SiO_2$, 1–3% $Al_2O_3$, 0–4 $Li_2O$, 4–16% $Na_2O$, 0–11% $K_2O$, 15–25% ZnO, 0–7% BaO, 0–4% MgO+CaO+SrO and 0–2% $B_2O_3$.

6. An article of crystal glassware in which the glass is essentially free from lead, that exhibits a density of at least 2.70 g/cm$^3$, a liquidus below 1000° C., and a long viscosity curve, a coefficient of thermal expansion in the range 70–110×10$^{-7}$/° C., good scratch resistance and chemical durability, and that has a composition, expressed in terms of weight percent on an oxide basis of:

| | | | |
|---|---|---|---|
| $SiO_2$ | 52–66 | ZnO | 15–30 |
| $Al_2O_3$ | 0–4 | BaO | 0–7 |
| $Li_2O$ | 0–4 | MgO + CaO + SrO | 0–5 |
| $Na_2O$ | 3–16 | $ZrO_2$ | 0–4 |
| $K_2O$ | 0–12 | $B_2O_3$ | 0–4. |

7. An article in accordance with claim 6 in which the glassware has a sonority efficiency of at least 3,000.

8. An article in accordance with claim 6 in which the glass contains at least 0.5% $Al_2O_3$.

9. An article in accordance with claim 6 in which the total content of $Na_2O+K_2O+Li_2O+B_2O_3$ does not exceed 16%.

10. An article in accordance with claim 6 in which the glass composition contains the three alkali metal oxides, $K_2O$, $Na_2O$ and $Li_2O$ in a molar ratio of 1:1:1.

11. An article in accordance with claim 6 in which the glass has a composition, expressed in weight percent on an oxide basis, in which at least 97% consists essentially of 56–63% $SiO_2$, 1–3% $Al_2O_3$, 0–4 $Li_2O$, 4–16% $Na_2O$, 0–11% $K_2O$, 15–25% ZnO, 0–7% BaO, 0–4% MgO+CaO+SrO and 0–2% $B_2O_3$.

12. A laminated, glass article comprising two glass components joined directly to each other, one component being a glass that is essentially free of lead, that exhibits a density of at least 2.70 g/cm$^3$, a liquidus below 1000° C., and a long viscosity-temperature curve, a coefficient of thermal expansion in the range 70–110×10$^{-7}$/° C., good scratch resistance and chemical durability, and that has a composition, expressed in terms of weight percent on an oxide basis of:

| | | | |
|---|---|---|---|
| $SiO_2$ | 52–66 | ZnO | 15–30 |
| $Al_2O_3$ | 0–4 | BaO | 0–7 |
| $Li_2O$ | 0–4 | MgO + CaO + SrO | 0–5 |
| $Na_2O$ | 3–16 | $ZrO_2$ | 0–4 |
| $K_2O$ | 0–12 | $B_2O_3$ | 0–4, | the other component being a glass having a different composition, but having a long viscosity-temperature curve that closely matches that of the first glass over the entire temperature range.

* * * * *